United States Patent
Fabry et al.

(10) Patent No.: US 7,340,339 B1
(45) Date of Patent: Mar. 4, 2008

(54) POWER MANAGEMENT SYSTEM

(75) Inventors: Mark D. Fabry, East Peoria, IL (US); Thad T. Litkenhus, Mackinaw, IL (US); Samuel R. Freesmeyer, Ashton, IL (US); Peter A. Brown, Edelstein, IL (US); Robert U. Murray, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 21 days.

(21) Appl. No.: 10/777,140

(22) Filed: Feb. 13, 2004

Related U.S. Application Data

(60) Provisional application No. 60/447,311, filed on Feb. 14, 2003.

(51) Int. Cl.
*B60K 6/04* (2006.01)
*B60T 7/12* (2006.01)

(52) U.S. Cl. ............... 701/104; 477/3; 903/917; 903/927; 903/940

(58) Field of Classification Search ............ 701/51, 701/54, 67–68, 1, 36, 50, 99–101, 104; 123/378, 123/542, 179.18, 14; 477/3; 903/917; G05D 1/00; G06F 17/00; F02M 15/02
See application file for complete search history.

(56) References Cited

U.S. PATENT DOCUMENTS

| | | | |
|---|---|---|---|
| 3,786,792 A * | 1/1974 | Pelizzoni et al. | 123/321 |
| 4,312,041 A * | 1/1982 | DeJonge | 701/123 |
| 4,368,705 A * | 1/1983 | Stevenson et al. | 123/357 |
| 4,461,151 A * | 7/1984 | Kanesaka | 60/611 |
| 4,493,303 A * | 1/1985 | Thompson et al. | 123/357 |
| 4,493,617 A * | 1/1985 | Brady et al. | 417/214 |
| 4,502,437 A * | 3/1985 | Voss | 123/357 |
| 4,534,707 A * | 8/1985 | Mitchell | 417/34 |
| 4,601,270 A * | 7/1986 | Kimberley et al. | 123/357 |
| 4,677,880 A | 7/1987 | Hattori et al. | |
| 4,770,064 A | 9/1988 | Kuerschner | |
| 4,885,690 A * | 12/1989 | Schimmel et al. | 701/54 |

(Continued)

FOREIGN PATENT DOCUMENTS

DE 3327370 A1 * 2/1985

(Continued)

OTHER PUBLICATIONS

Reich, R., Practical Investigations on a Tractor with a Diesel Ethanol Engine, Nov. 83, 57p from Dialog(R) File 6, acc. No. 1425780).*

(Continued)

*Primary Examiner*—Cuong Nguyen
(74) *Attorney, Agent, or Firm*—Finnegan, Henderson, Farabow, Garrett & Dunner

(57) ABSTRACT

An exemplary power management system may include a power source configured to receive a fuel supply and a transmission driveably engaged with the power source. A control system communicates with the power source and the transmission and is configured to determine a fuel supply limit associated with a desired speed of the power source. The fuel supply limit may be determined from a fuel curve associated with the machine. The control system is operative to modify at least a portion of the fuel curve based on a load condition of the power source.

17 Claims, 3 Drawing Sheets

U.S. PATENT DOCUMENTS

| | | | | |
|---|---|---|---|---|
| 4,914,597 | A * | 4/1990 | Moncelle et al. | 701/95 |
| 5,006,994 | A * | 4/1991 | Andersson et al. | 701/123 |
| 5,056,026 | A * | 10/1991 | Mitchell et al. | 701/101 |
| 5,086,739 | A * | 2/1992 | Frankle | 123/357 |
| 5,121,324 | A * | 6/1992 | Rini et al. | 701/105 |
| 5,476,425 | A | 12/1995 | Shiraishi et al. | |
| 5,477,827 | A | 12/1995 | Weisman, II et al. | |
| 5,549,525 | A | 8/1996 | Wendel | |
| 5,580,331 | A | 12/1996 | Shiraishi et al. | |
| 5,670,830 | A * | 9/1997 | Koga et al. | 307/10.1 |
| 5,732,676 | A | 3/1998 | Weisman et al. | |
| 5,819,705 | A * | 10/1998 | Scherer et al. | 123/357 |
| 5,901,684 | A * | 5/1999 | Fiaschetti et al. | 123/436 |
| 6,138,782 | A * | 10/2000 | Anderson et al. | 180/6.44 |
| 6,144,911 | A | 11/2000 | Binz et al. | |
| 6,220,223 | B1 | 4/2001 | Weisman, II et al. | |
| 6,283,102 | B1 * | 9/2001 | Nelson et al. | 123/575 |
| 6,445,990 | B1 * | 9/2002 | Manring | 701/50 |
| 6,616,575 | B1 * | 9/2003 | Lorentz | 477/115 |
| 6,644,272 | B2 * | 11/2003 | Furukawa et al. | 123/378 |
| 6,708,088 | B2 * | 3/2004 | Matsuno et al. | 701/1 |
| 6,708,507 | B1 * | 3/2004 | Sem et al. | 62/126 |
| 6,718,242 | B1 * | 4/2004 | Mori et al. | 701/41 |
| 6,812,942 | B2 * | 11/2004 | Ribak | 701/211 |
| 2002/0016653 | A1 * | 2/2002 | Levine | |
| 2002/0133279 | A1 * | 9/2002 | Manring | 701/50 |
| 2003/0100975 | A1 * | 5/2003 | Hashimoto et al. | |

FOREIGN PATENT DOCUMENTS

| | | | |
|---|---|---|---|
| DE | 3501276 | C * | 7/1989 |
| DE | 4128728 | A1 * | 3/1993 |
| EP | 221386 | A2 * | 5/1987 |
| EP | 339003 | A * | 10/1989 |
| EP | 385969 | B1 * | 10/1992 |
| EP | 391062 | B1 * | 11/1992 |
| EP | 771943 | A2 * | 5/1997 |
| JP | 01067476 | A * | 3/1989 |
| JP | 02041976 | A * | 2/1990 |
| JP | 02149746 | A * | 6/1990 |
| JP | 07095796 | A * | 4/1995 |
| JP | 08019114 | A * | 1/1996 |
| JP | 09024846 | A * | 1/1997 |
| JP | 3016349 | B2 * | 3/2000 |
| JP | 2001107788 | A * | 4/2001 |
| JP | 2002029432 | A * | 1/2002 |
| JP | 2003206779 | A * | 7/2003 |
| WO | WO 9001115 | A * | 2/1990 |

OTHER PUBLICATIONS

R. Bentzen, D.E.T.S.—Diesel Engine Tuning System, Oct. 1997, Schiff und Hafen Journal, vol. 29, pp. 2 (from Dialoog(R) File 63, acc. No. 00173733).*

Preliminary biochemical fuel cell investigations, Colichman, E.L.; Proceedings of the IEEE, vol. 51, Issue 5, May 1963 pp. 812-819.*

Generation reliability impacts of industry-owned distributed generation sources, Chowdhury, A.A.; Koval, D.O.; Industry Applications Conference, 2003. 38th IAS Annual Meeting. Conference Record of the, vol. 2, Oct. 12-16, 2003 pp. 1321-1327 vol. 2.*

Thermal management of portable micro fuel cell stacks, Hahn, R.; Krumm, M.; Reichl, H.; Semiconductor Thermal Measurement and Management Symposium, 2003, Ninteenth Annual IEEE, Mar. 11-13, 2003 pp. 202-209, Digital Object Identifier 10.1109/STHERM.2003.1194363.*

Cost-effective energy system measures studied by dynamic modelling, Andersson, M.; Bjork, C.; Karlsson, B.; Advances in Power System Control, Operation and Management, 1993. APSCOM-93., 2nd International Conference on, Dec. 7-10, 1993 pp. 448-455 vol. 1.*

* cited by examiner

POWER MANAGEMENT SYSTEM

CROSS-REFERENCE TO RELATED APPLICATION

This application claims the benefit of provisional patent application No. 60/447,311, filed on Feb. 14, 2003, the contents of which are incorporated herein by reference.

TECHNICAL FIELD

This invention relates generally to an integrated engine and transmission control system and, more particularly, to a power management system for providing overload protection of the integrated engine and transmission control system and associated vehicle.

BACKGROUND

A power management system of a drawbar machine may be designed based on a maximum machine weight and an engine torque curve. Maximum rimpull for the drawbar machine may be slip limited or power limited. In a slip limited machine, the vehicle's tires or tracks will spin if the force required to pull an implement exceeds the maximum rimpull that a vehicle can produce based on its weight and coefficient of traction. In a power limited machine, the engine will shut off before the tires or tracks spin because each gear is designed for the maximum rimpull capable by the engine.

An overload condition may occur in a slip-limited vehicle due to the effects of increased weight or weight transfer, for example, when a implement, such as a scraper or 3-point mounted implement, produces a relatively high amount of weight transfer to the drawbar machine or when extra weight is added to the vehicle for additional ballast and/or for additional fuel tanks. When the weight is increased onto the drawbar machine, the slip limit is increased, therefore increasing the designed stress levels on structural components, such as cases and frames, and powertrain components, such as gears, bearings, and shafts. When these stress levels are raised, the life of the machine may be significantly reduced, leading to customer dissatisfaction, repair costs, lost time, lost revenue, high warranty costs for the manufacturer, and/or degradation of the manufacturer's reputation.

Typically, an engine that is used in a drawbar machine is also used in other applications. Since these other applications have different requirements for the same engine, different lug curves may be certified for each application. With the advent of engine electronics, the same engine, in the same machine, can have different certified lug curves.

Some conventional engines implement a de-rating strategy in lower gears to prevent overloading by sensing the transmission gear and setting the engine to a different certified lug curve based on the gear. Using multiple certified lug curves on a drawbar machine may cause abrupt changes in rimpull, for example, a rimpull hole. A rimpull hole refers to a decrease in rimpull when downshifting that may cause the engine to lug further than normal. In addition, some of the gears may not have enough protection from the engine due to the lack of certified curves. For example, on a 300 horsepower tractor, first gear protection may require the engine to be slip limited to 150 horsepower, but the lowest certified level may be 250 horsepower, leaving first gear at risk of overload failures.

The power management system of the present invention may solve one or more of the problems set forth above.

SUMMARY OF THE INVENTION

In accordance with one aspect of the invention, an exemplary power management system may include a power source configured to receive a fuel supply and a transmission driveably engaged with the power source. A control system communicates with the power source and the transmission and is configured to determine a fuel supply limit associated with a desired speed of the power source. The fuel supply limit may be determined from a fuel curve associated with the machine. The control system is operative to modify at least a portion of the fuel curve based on a load condition of the power source.

In accordance with another aspect of the invention, a power management system for a machine may include a power source configured to receive a fuel supply and a transmission driveably engaged with the power source. A control system in communication with the power source and the transmission, the control system being configured to modify a fuel supply limit, the fuel supply limit being regulated based on rack position and a load condition of the power source.

In accordance with yet another aspect of the invention, a method for operating a power management system is provided. The method may include driving a transmission with a power source and modifying a fuel supply limit of fuel being supplied to the power source based on rack position and a load condition of the power source.

It is to be understood that both the foregoing general description and the following detailed description are exemplary and explanatory only and are not restrictive of the invention.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
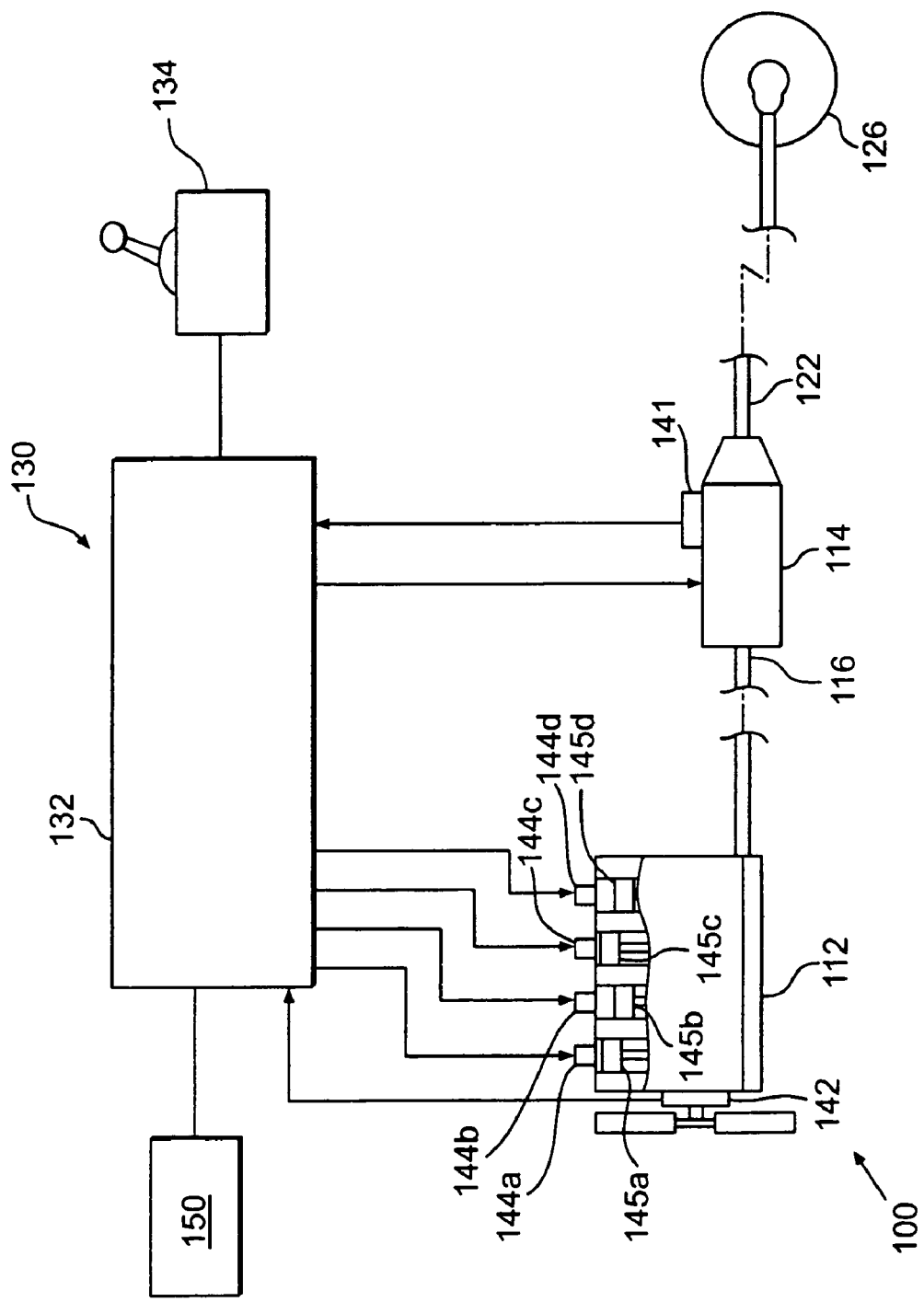
FIG. 1 is a schematic illustration of an exemplary power management system in accordance with the present invention.

Referring to FIG. 1, an exemplary embodiment of the present invention will be described. FIG. 1 is a schematic illustration of an exemplary power management system 100 for a work machine, such as an agricultural vehicle or a construction vehicle, including a work implement. The power management system 100 may be equipped with a power source 112 such as, for example, an engine, and a transmission 114, for example, a power-shift transmission, an automatic transmission, or the like.

The transmission 114 may have neutral, a plurality of forward gear ratios, and one or more reverse gear ratios; however, it can readily be adapted to different transmission configurations, as would be apparent to one skilled in the art.

The transmission 114 may include lower gears that are slip-limited and higher gears that are power-limited. In an exemplary 16-gear transmission, gears one through four may be slip-limited and gears five through sixteen may be power-limited. Alternatively, gears one through six may be slip-limited and gears seven through sixteen may be power-limited. It should be appreciated that other transmission configurations could be used.

The transmission 114 may include a drive member 116, for example, a countershaft, connected to and driven by the engine 112. The output of the transmission 114 may be connected to and configured to rotatably drive a shaft 122. The shaft 122 may in turn be connected to and configured to drive a ground engaging wheel 126, thereby propelling the vehicle. In this manner, engine torque or power may be transmitted to the wheel 126 with a predetermined speed ratio.

One skilled in the art would appreciate that the drive member 116 may optionally be driven by the engine 112 through a torque converter (not shown) equipped with a lockup clutch (not shown). Alternatively, the drive member may be driven without a torque converter and through use of an electronic clutch. Any other known arrangement may be employed for the engine 112 to drive the drive member 116 without departing from the scope of the exemplary embodiment.

A control system 130 may include an engine and transmission controller 132 embodied in a single microprocessor. Numerous commercially available microprocessors can be adapted to perform the functions of the engine and transmission controller. It should be appreciated that engine and transmission controllers could readily be embodied in separate microprocessors adapted to communicate via a data link without departing from the scope of the exemplary embodiment.

The controller 132 may be configured to receive inputs including a desired vehicle speed signal from, for example, a control lever mechanism 134, for example, an operator-controlled lever, and effect gear changes in the transmission 114 in response to the received signals and in accordance with a predetermined shifting strategy, as is known in the art.

A gear selector (not shown) may be provided for indicating a desired transmission gear ratio and direction of travel. It should be appreciated that the gear selector can be embodied in any device or combination of devices capable of providing an electrical signal for indicating a desired gear ratio and direction of travel. For example, the gear selector can be in the form of movable lever having a neutral position and one or more forward gear positions and reverse gear positions. A sensor (not shown), such as a switch or potentiometer, may be adapted to sense the position of the gear selector and produce a desired gear signal responsive to the selector's position. The desired gear signal may be supplied to the controller 132. As vehicle speed increases or decreases, the controller 132 effects gear shifting in accordance with a preset shift map until the desired gear is reached.

A gear sensor 141 may be provided for sensing the actual transmission gear ratio and producing a gear ratio signal. Optionally, the sensor 141 may be in the form of a combination of switches, which produce a unique code for each transmission gear ratio as would be appreciated by one skilled in the art. The controller 132 may have an input adapted to receive the actual gear ratio signal.

The controller 132 may be adapted to receive operating parameters including an operator desired speed signal and an actual engine speed signal, and to responsively regulate engine speed in a closed-loop control. For this purpose, the control system may include a pedal position sensor (not shown) adapted to produce an electrical signal responsive to the position of the vehicle's accelerator (not shown), for example, a pedal, a lever, or the like. Additionally, the control system may include an engine sensor 142 adapted to sense engine speed and produce an engine speed signal. Optionally, the engine speed sensor 142 may be in the form of a magnetic pick-up sensor adapted to produce a signal corresponding to the rotational speed of the engine 112. The sensor 142 may be capable of determining the speed, angular position, and direction of rotation of a rotatable shaft.

The controller 132 may process the received signals to produce a fuel injection control signal for regulating the fuel delivery to the engine 112 in response to a difference between a desired engine speed signal and the actual engine speed signal and in accordance with engine control maps, for example, rail pressure maps, timing maps, torque limit maps, etc., as is known in the art.

The injection control signal may be delivered to solenoid operated fuel injector units 144*a-d* associated with individual engine cylinders 145*a-d* (four shown for illustration purposes) of the engine 112. The duration of the injection control signal corresponds to the on-time of the solenoid, thereby controlling the duration for which the injector 144*a-d* delivers fuel to an associated cylinder 145*a-d* during the combustion cycle. The solenoid operated fuel injectors may be hydraulically-actuated units, mechanically-actuated units, or any other units known in the art.

The delivery of fuel may be limited in accordance with a machine fuel limit curve. The machine fuel limit curve 300, illustrated in FIG. 3, may be applicable for all gears of the transmission 114 and through all operating speeds of the power source 112. The fuel supply limit may be represented as "rack position," as is known in the art. The machine fuel limit curve 300 is predetermined based on testing data and is generally optimized for desired machine performance. Since the engine 112 and the transmission 114 may be used in vehicles having different applications, each vehicle may have a different fuel limit curve based on its intended operation.

Figure 2:
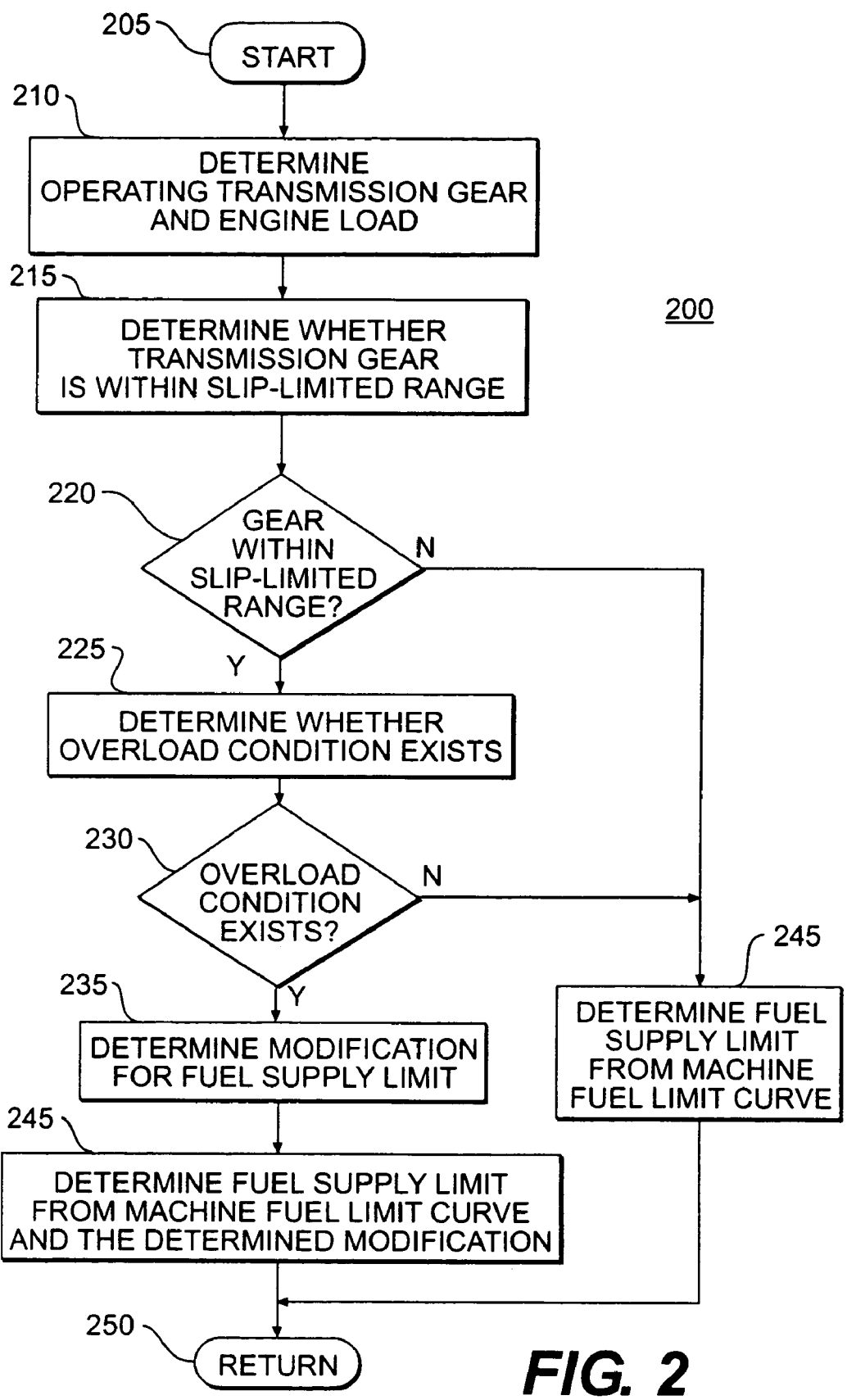
FIG. 2 is a flowchart illustrating an exemplary operation of a power management system in accordance with the present invention.

Referring now to FIG. 2, an operation 200 employing a power management system in accordance with certain aspects of the invention is explained. Control commences in step 205 when the controller 132 initiate determination of a fuel supply limit. Control continues to step 210.

In step 210, the controller 132 determines the transmission operating gear and the engine load. The transmission operating gear may be determined from the gear ratio of the transmission 114, which may be determined from the speed of the drive member 116 (i.e., into the transmission 114) and the speed of the shaft 122 (i.e., out of the transmission 114). Engine load may be determined by monitoring engine load based on rack position. The load may also be measured at the drawbar or three-point hitch of vehicles. Control continues to step 215.

Then, in step 215, the controller 132 determines whether the operating transmission gear is within a predetermined slip-limited range of the transmission 114. If, in step 220, it is determined that the operating transmission gear is within the slip-limited range, control continues to step 225. If, in step 220, it is determined that the operating transmission gear is not within the slip-limited range, control skips to step 245.

In step 225, the controller 132 determines whether an overload condition exists; that is, whether the engine load constitutes an overload condition. The overload condition may occur, for example, due to the effects of increased weight of or weight transfer to the machine. For example, an implement, such as a scraper or 3-point mounted implement, may produce a relatively high amount of weight transfer to the drawbar machine, or extra weight may be added to the machine for additional ballast and/or for additional fuel tanks. If, in step 230, it is determined that an overload condition exists, control continues to step 235. If, in step 230, it is determined that an overload condition does not exist, control skips to step 245.

In step 230, the controller 132 determines a modification for the fuel supply limit (i.e., maximum rack position). The modification may be determined via a look-up table, an equation, interpolation from a graph, or the like. The modification may include a multiplication factor, for example, a percentage, that can be used to modify a fuel supply limit determinable from the machine fuel limit curve 300. The modification may modify the fuel limit based engine load, engine speed, rack position, and/or transmission operating gear. It should be appreciated that other engine operating conditions may be factored into the modification. Control then continues to step 240.

Then, in step 240, the controller 132 determines a fuel supply limit from the machine fuel limit curve and the determined modification. For example, a fuel supply limit may first be determined from the machine fuel limit curve 300, for example, by interpolation, based on the speed of the power source 112. The fuel supply limit may then be multiplied by the previously determined modification to arrive a modified fuel supply limit. Control then proceeds to step 250, where control is returned to the main program (not shown).

In step 245, the controller 132 determines a fuel supply limit from the machine fuel limit curve 300 for conditions outside the slip-limited range and/or where an overload condition does not exist. Control then proceeds to step 250, where control is returned to the main program (not shown).

When control is returned to the main program, the amount of fuel being supplied to the engine 112 is limited by the fuel supply limit determined by the exemplary power management operation 200. It should be appreciated that the amount of fuel to be delivered to the engine 112 may also be limited by other factors such as, for example, a smoke rack limit to prevent emissions of black smoke that result from too rich of an air/fuel mixture.

Optionally, the exemplary power management operation 200 may include a time delay for implementing a fuel supply limit based on an overload condition. In other words, the controller 132 may allow the overload condition to continue for a period of time to provide an operator with an opportunity to continue with unaltered vehicle performance while the operator works through a short period of difficulty. The period of delay may vary depending on the operation environment or other factors, For example, the delay period may be two seconds, five seconds, ten seconds, or the like. However, the controller 132 will eventually implement the fuel supply limit based the an overload condition to prevent continuous operation of the machine under the overload condition.

In another optional embodiment, the power management operation 200 may include a smoothing algorithm to prevent rapid changes in the fuel supply limit. Since the power management operation 200 is being dynamically performed, for example, during each iteration of the control system 130, the fuel supply limits may be altered through smooth transitions.

In yet another embodiment, the power management operation 200 may include a time limit, after which the fuel supply limit may be further reduced. For example, if an operator encounters an overload condition and the power management system 100 effectuates a reduction in the fuel supply limit according to the power management operation 200, but the operator continues to operate in the overload condition, the fuel supply limit may be further reduced in an attempt to encourage the operator to change to a more productive mode of operation.

The exemplary power management system 100 may optionally include a management center 150. The management center 150 may be disposed at a location of the machine proximate to the operator. The management center 150 may include visual and/or audible indicators to notify the operator that the power management system is operating under an overload condition. Thus, the operator may more easily recognize overload conditions and change operation of the machine. Through the management center 150, the power management system 100 could be used as a training tool by indicating which modes of operation are efficient and productive.

Figure 3:
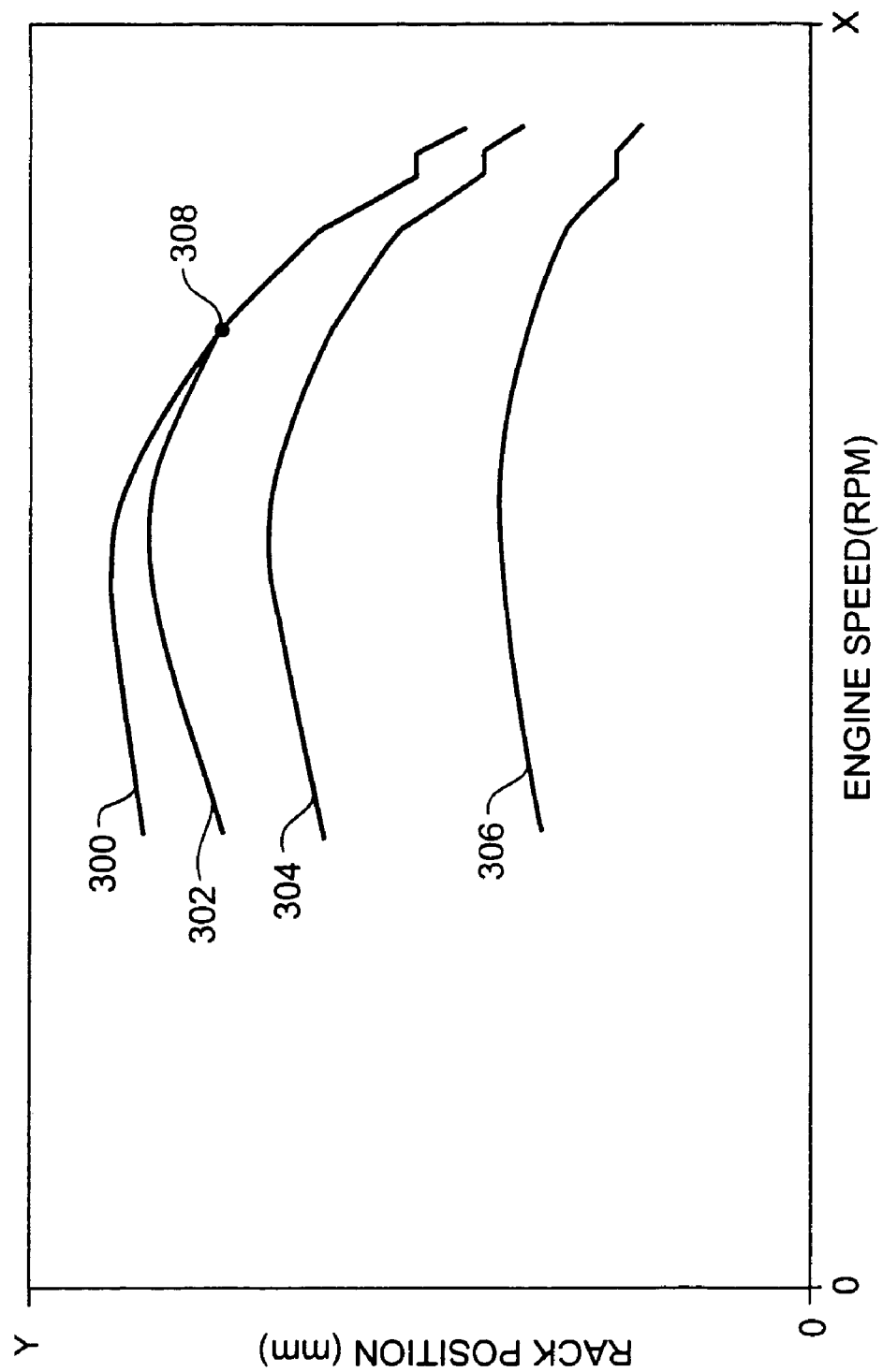
FIG. 3 is a graph illustrating a modified engine torque curve in an exemplary power management system.

The exemplary power management operation 200 may produce multiple fuel supply limit curves by modifying the machine fuel supply curve. For example, in a vehicle having a transmission that is slip-limited in gears one through three, FIG. 3 illustrates an exemplary machine fuel supply limit curve 300 and exemplary modified fuel supply limit curves for third gear 302, second gear 304, and first gear 306. The fuel supply limit is indicated as rack position over a range of engine speeds. As shown, the fuel supply limit for third gear is only modified from the machine fuel supply limit over a portion of the engine speed range; that is, until the curves 300, 302 merge at point 308.

INDUSTRIAL APPLICABILITY

In operation, fuel is supplied to the power source 112 to generate power to drive an output shaft 116, which, in turn, drives a ground-engaging element 126 via a transmission 114. During normal operating conditions, the amount of fuel being supplied to the power source 112 may be limited based on various factors, for example, emissions limits, and the like. The fuel supply is also limited by a machine fuel supply curve designed to optimized vehicle performance, efficiency, emissions, and the like.

During operation in lower gears of the transmission 114, the fuel supply limit may be lowered in the event of an overload condition to protect the machine components, for example, the driveline components, from excessive wear and premature failure. For example, in a 16-gear transmission, gears one through three may be slip-limited, rather than power-limited. Further, a gear may not be slip-limited throughout the full range of engine speeds. For example, third gear may only be limited through a portion of the range of engine speeds, while first and second gear may be slip-limited throughout the entire range of engine speeds. One skilled in the art would recognize that the range of slip-limited gears may vary in different vehicles. For example, the slip-limited range of gears may extend from first through sixth.

If a transmission 114 is operating in a gear within the slip-limited range, the fuel supply limit may be lowered in the event of an overload condition. The overload condition may be determined from engine load, which may be determined by monitoring engine load based on rack position. If the transmission 114 is operating in the slip-limited gear range and an overload condition exists, the fuel supply limit determined according to the machine fuel supply limit curve 300 may be lowered according to the power management operation 200. If the transmission 114 is not operating in the slip-limited range or if no overload condition exists, the fuel limit continues to be determined in accordance with the machine fuel supply limit curve 300.

When the fuel supply limit is lowered, a the supply of fuel may subsequently be limited causing a reduction in engine power. Since limiting the supply of fuel is similar to running at part load, no change in emission rates occurs. Further, the reduction in engine power may encourage a change to a more productive mode of operation.

A power management system in accordance with exemplary embodiments of the invention may reduce stress levels and frictional wear to driveline components. In addition, power management system may prevent operator abuse and reduce the effect of operator inexperience or other abnormal operating conditions. Thus, premature failure of the machine and/or its components may be avoided, and the efficiency, productivity, and lifespan of the machine may be increased. Moreover, since limiting fueling via the modified fuel supply limit is similar to running the machine at "part load," the emission rates of the vehicle remain unchanged.

It will be apparent to those skilled in the art that various modifications and variations can be made in the disclosed power management system without departing from the scope or spirit of the invention. Other embodiments of the invention will be apparent to those skilled in the art from consideration of the specification and practice of the invention disclosed herein. It is intended that the specification and examples be considered as exemplary only.

What is claimed is:

1. A power management system for a machine, comprising:
    a power source configured to receive a fuel supply based on a fuel curve associated with the machine;
    a transmission being driveably engaged with the power source; and
    a control system in communication with the power source and the transmission, the control system being configured to determine a fuel supply limit associated with a desired speed of the power source, the fuel supply limit being determined from the fuel curve associated with the machine,
    wherein the control system is operative to modify at least a portion of the fuel curve to reduce the fuel supply when a load condition of the power source exceeds a desired amount.

2. A power management system for a machine, comprising:
    a power source configured to receive a fuel supply based on a fuel supply limit associated with the machine;
    a transmission being driveably engaged with the power source; and
    a control system in communication with the power source and the transmission, the control system being configured to modify the fuel supply limit to reduce the fuel supply, the fuel supply limit being regulated based on rack position and a load condition of the power source exceeding a desired amount.

3. A method for operating a power management system, comprising:
    driving a transmission with a power source receiving a fuel supply based on a fuel supply limit; and
    modifying the fuel supply limit to reduce the fuel supply being supplied to the power source based on rack position and a load condition of the power source exceeding a desired amount.

4. The system of claim 1, further including a drive train operably coupled to the transmission.

5. The system of claim 4, wherein the drive train is configured to drive tracks of an earth-working machine.

6. The system of claim 1, wherein the control system is configured to sense power source load and transmission operating gear, and wherein the control system is configured to determine whether the transmission operating gear is within a predetermined slip-limited range of the transmission.

7. The system of claim 6, wherein the control system is configured to compare the sensed power source load with a predetermined power source overload parameter and modify the fuel supply limit if the sensed power source load exceeds the predetermined power source overload parameter.

8. The system of claim 1, wherein the control system is configured to modify the fuel curve based on the load condition of the power source and at least one of power source speed and transmission operating gear.

9. The system of claim 2, further including a drive train operably coupled to the transmission.

10. The system of claim 9, wherein the drive train is configured to drive tracks of an earth-working machine.

11. The system of claim 2, wherein the control system is configured to sense power source load and transmission operating gear, and wherein the controller is configured to determine whether the transmission operating gear is within a predetermined slip-limited range of the transmission.

12. The system of claim 11, wherein the control system is configured to compare the sensed power source load with a predetermined power source overload parameter and modify the fuel supply limit if the sensed power source load exceeds the predetermined power source overload parameter.

13. The system of claim 2, further including an emissions sensor configured to sense an amount of emissions leaving the power source, and wherein the control system is configured to modify the fuel curve based on the sensed amount of emissions.

14. The method of claim 3, further including determining whether a transmission operating gear of the transmission is within a predetermined slip-limited range of the transmission, and comparing the load condition of the power source with a predetermined power source overload parameter.

15. The method of claim 3, wherein modifying the fuel supply limit includes determining a modification factor for modifying the fuel supply limit.

16. The method of claim 3, further including determining the fuel supply limit based on a machine fuel limit curve if a transmission operating gear is outside a predetermined slip-limited range of the transmission.

17. The method of claim 3, further including sensing an amount of emissions leaving the power source and modifying the fuel supply limit based on the sensed amount of emissions.

* * * * *

UNITED STATES PATENT AND TRADEMARK OFFICE
CERTIFICATE OF CORRECTION

PATENT NO. : 7,340,339 B2  Page 1 of 1
APPLICATION NO. : 10/777140
DATED : March 4, 2008
INVENTOR(S) : Fabry et al.

It is certified that error appears in the above-identified patent and that said Letters Patent is hereby corrected as shown below:

Please correct the Inventors as follows:
Title page, item (75), delete "Thad" and insert -- Thaddeus --.

Title page, item (75), delete "Ashton, IL (US)" and insert -- Duluth, GA (US) --.

Please correct the References Cited as follows:
Title page, item (56), under "Other Publications", delete "from" and insert -- (from --.

Page 2, item (56), under "Other Publications", delete "Dialoog(R)" and insert -- Dialog(R) --.

Signed and Sealed this

Twenty-first Day of October, 2008

JON W. DUDAS
*Director of the United States Patent and Trademark Office*